US007684707B2

(12) United States Patent
Needle et al.

(10) Patent No.: US 7,684,707 B2

(45) Date of Patent: Mar. 23, 2010

(54) METHODS AND APPARATUS FOR GENERATING LOCAL OSCILLATION SIGNALS

(75) Inventors: Jack Needle, Dix Hills, NY (US); Dimitrios Kokkinos, Flushing, NY (US)

(73) Assignee: Verizon Services Corp. & Verizon Communications Inc., Arlington, VA (US)

( * ) Notice: Subject to any disclaimer, the term of this patent is extended or adjusted under 35 U.S.C. 154(b) by 68 days.

(21) Appl. No.: 11/744,400

(22) Filed: May 4, 2007

(65) Prior Publication Data

US 2008/0112704 A1 May 15, 2008

Related U.S. Application Data

(60) Division of application No. 11/069,301, filed on Mar. 1, 2005, now Pat. No. 7,224,896, which is a continuation of application No. 09/667,419, filed on Sep. 21, 2000, now Pat. No. 6,978,091, which is a continuation-in-part of application No. 09/283,400, filed on Apr. 1, 1999, now Pat. No. 6,538,781, which is a continuation-in-part of application No. 08/806,090, filed on Feb. 25, 1997, now Pat. No. 6,055,077.

(51) Int. Cl.
*H04J 14/02* (2006.01)

(52) U.S. Cl. ........................................................ 398/72

(58) Field of Classification Search .............. 398/70–72
See application file for complete search history.

(56) References Cited

U.S. PATENT DOCUMENTS 4,574,305 A * 3/1986 Campbell et al. ........... 725/119
4,627,105 A 12/1986 Ohashi et al.
4,891,694 A 1/1990 Way
4,994,909 A 2/1991 Graves et al.
5,020,049 A 5/1991 Bodeep et al.
5,111,323 A 5/1992 Tanaka et al.
5,136,411 A 8/1992 Paik et al.
5,202,780 A 4/1993 Fussganger
5,221,983 A 6/1993 Wagner
5,309,564 A 5/1994 Bradley et al.
5,387,927 A 2/1995 Look et al.
5,457,560 A 10/1995 Sharpe et al.
5,483,277 A 1/1996 Granger
5,517,232 A 5/1996 Heidemann et al.
5,534,912 A * 7/1996 Kostreski .................... 725/106
5,680,238 A 10/1997 Masuda
5,689,356 A 11/1997 Rainal
5,793,798 A 8/1998 Rudish et al.
5,969,836 A 10/1999 Foltzer
6,055,077 A 4/2000 Needle et al.
6,268,946 B1 7/2001 Larkin et al.
6,538,781 B1 * 3/2003 Beierle et al. ................. 398/79
6,603,822 B2 * 8/2003 Brede et al. ................. 375/340
2004/0037560 A1 2/2004 Mells

OTHER PUBLICATIONS

1997—Ogura et al, "Launch of'CATV Video Distribution Service' over FTTH", NTT Review, vol. 9, No. 6, Nov. 1997, pp. 104-112.
Hiroshige Ogura, Takeo Toide, Hisatoshi Miyazaki, Satoru Sugimoto and Akihisa Sonoda, Launch of "CATV Video Distribution Service" over FTTH, NTT Review, Nov. 1997, vol. 9, No. 6, pp. 104-112.

* cited by examiner

*Primary Examiner*—Leslie Pascal

(57) ABSTRACT

Generating oscillator signals with which selected signals may be mixed. Such oscillator signals may be generated by dividing a pilot tone, such as a 120 MHz pilot tone found on many cable TV systems. Oscillator signals for demodulating received selected signals may be similarly generated.

6 Claims, 11 Drawing Sheets

METHODS AND APPARATUS FOR GENERATING LOCAL OSCILLATION SIGNALS

RELATED APPLICATIONS

This is a divisional of U.S. patent application Ser. No. 11/069,301, filed Mar. 1, 2005, which is a continuation of U.S. patent application Ser. No. 09/667,419, filed Sep. 21, 2000, now U.S. Pat. No. 6,978,091, entitled "Methods and Apparatus for Generating Local Oscillation Signals," which is a continuation-in-part of U.S. patent application Ser. No. 09/283,400, filed on Apr. 1, 1999, now U.S. Pat. No. 6,538, 781, entitled "Multimedia Distribution System Using Fiber Optic Lines," and which is a continuation-in-part of U.S. patent application Ser. No. 08/806,090, issued as U.S. Pat. No. 6,055,077, entitled "Multimedia Distribution System Using Fiber Optic Lines." Each of these applications and patents are incorporated herein by reference and priority is claimed to these applications under 35 U.S.C. § 120.

FIELD OF THE INVENTION

The present invention concerns generating local oscillator signals which may be used in a multimedia system (disclosed in the "related applications" referred above) which distributes information from a central location, such as a central station or central office for example, to one or more subscribers, and in particular, a switchable system which selectively distributes information to each of the subscribers from the central location.

BACKGROUND OF THE INVENTION

With increasing bandwidths available on fiber optic communication paths, information providers can now deliver a broader range of information, e.g., high definition video, to a subscriber premises. However, even with advancements in optical fiber telecommunication technology, theft of services remains a growing concern among information providers (e.g., cable television service providers). The problem involves the fact that once a central station distributes signals in a general manner to a subscriber premises, the central station loses control of the signals. As a result, such signals are exposed to theft which results in lost revenue.

Presently, one approach to remedy the service theft problem is to transmit scrambled signals or channels to each subscriber's premises. Each subscriber premises is equipped with a smart set top box to descramble those signals or channels ordered by the subscriber. Such systems however require additional equipment, specifically scramblers and descramblers, which increases their overall cost. Moreover, intelligent set top boxes that permit theft of services are presently available on the black market. Such set top boxes can descramble all scrambled signals transmitted to the subscriber premises, thereby allowing the subscriber access to those signals or channels.

Another approach to remedy the service theft problem is found in U.S. Pat. No. 4,994,909 (hereafter referred to as "the Graves patent"). The Graves patent provides a video signal distribution system (hereafter "the Graves system") that includes a services switching device and an optical network interface (ONI) for selecting particular signals for delivery to a subscriber. The services switching device employs multiplexers for producing time-division multiplexed (TDM) signals. Because the processing and routing of TDM signals is typically accomplished utilizing electronics, a drawback of the Graves system is a need for optical-to-electrical and electrical-to-optical conversions and for controlled environmental vaults, power back-ups and maintenance.

Another multi/demultiplexing technique that employs optical rather than electrical multiplexing, is wavelength division multiplexing (WDM). WDM provides significant advantages over TDM. Specifically, wavelength multiplexed channels can be separated and combined passively, independent of the format and bit rate of the data being transferred. An example of a fiber optic subscriber loop architecture utilizing WDMs is found in U.S. Pat. No. 5,221,983 (hereafter referred to as "the Wagner patent"). However, such subscriber-type systems employing WDMs neither provide nor suggest any mechanism for selecting particular signals for delivery to a subscriber premises.

Accordingly, it is an object of the system (disclosed in the "related applications" referenced above) in which the present invention may be used, to provide a fiber optic subscriber loop architecture, based on WDM techniques, which can selectively transmit only those bands ordered by the subscriber to the subscriber premises.

A further object of the system (disclosed in the "related applications" referenced above) in which the present invention may be used, is to eliminate the need for scramblers and descramblers at the subscriber premises and, thus, reduce the overall cost of the system.

Another object of the system (disclosed in the "related applications" referenced above) in which the present invention may be used, is to prevent theft of information services.

Besides the aforementioned shortcomings and limitations of the prior art, the system (disclosed in the "related applications" referenced above) in which the present invention may be used also overcomes limitations and deficiencies relating to wideband transmission to the subscriber premises, especially wideband digital services. In providing these services, the information destined for the subscribers is digitally encoded, typically using the MPEG or MPEG-2 (Moving Pictures Experts Group) standards, and propagate as a digital stream over the transmission medium. (Digital encoding (or compression) is deployed to effectively utilize the bandwidth of the communications medium.) If front-end encoding is used, the receiver at each customer premises requires digital decoder to reconstruct the original information. Moreover, if two-way or bi-directional communication is desired, then the equipment at the customer premises may be arranged with a digital encoder. The decoding/encoding required by the customer's equipment is expensive. Moreover, it is virtually impossible with such an arrangement to deliver tailored services, that is, subscriber-dependent services, to each individual subscriber.

To overcome the limitations of encoded digital propagation, some recently devised systems focus on non-encoding propagation so that that subscriber's TV may be used in the conventional manner to receive the transmitted signals. Representative of such technology using a single-fiber for a transmission medium is a system for propagating a plurality of downstream video channels over the single fiber in combination with two-way interactive telephony communications over the same fiber, as disclosed in the article, H. Ogura et al, "Launch of 'CATV Video Distribution Service' over FTTH", *NTT Review*, Vol. 9, No. 6 (November 1997) (hereafter referred to as "the Ogura article"). As described in the Ogura article, two or more communications channels are delivered over a single optical fiber from a head-end to a subscriber's home to effect fiber-to-the-home (FTTH) service. In general, the design philosophy for the system discussed in the Ogura article (hereafter referred to as "the Ogura system") is one of the separating downstream video from interactive, non-video communications; that is, propagating the downstream video at one wavelength (namely, 1.5 micrometers) and the interactive telephony communications at the second wavelength (namely, 1.3 micrometers). Moreover, this bi-directional telephony arrangement uses TCM (time compression multiplexing) in the so-called "ping-pong" communication mode, wherein all downstream receivers detect the same signal, and each upstream communication from a given subscriber is assigned a unique time slot.

In particular, in the Ogura system, connections from the head-end to each of the customers fans-out. Consequently, every customer receives the same downstream signal-broadcast from the head-end. That is, there is no ability to deliver to a given subscriber selected ones of the video channels composing the propagated downstream signal. Such an arrangement is typically referred to as a "tree-and-branch" delivery system. Consequently, there is the potential for theft of the services as alluded to above. In addition, to derive the signal for the subscriber, a number of signal splitters are deployed. Consequently, the signal delivered to front-end of the cascade of splitters must have a high power level. This is disadvantageous since high power components tend to be more costly.

Moreover, the Ogura system was designed to be implemented on already existing 1.3 micrometer zero-dispersion fibers to reduce implementation costs, but the downstream video utilizes the 1.5 micrometer wavelength for propagation. When a 1.5 micrometer optical wavelength is transmitted through a 1.3 micrometer zero-dispersion fiber, fiber dispersion induces a degradation with a concomitant deterioration in signal (e.g., video signal) quality. Consequently, the Ogura system must be arranged with dispersion compensation, which adds to its complexity and cost.

Also, the types of interactive services taught or suggested by the Ogura article are existing services such as plain old telephone service (POTS) and narrowband ISDN. There is no teaching or suggestion of using the interactive services part of the Ogura system (1.3 micrometer wavelength) for video, especially video conferencing, or wideband data. In brief, the Ogura system separates video (downstream at 1.5 micrometers) from telephony (upstream and downstream at 1.3 micrometers) using a tree-and-branch delivery system for downstream transmission. This is in contrast to the present inventive subject matter, wherein the wavelength assignments are characterized as separating downstream from upstream, irrespective of the content of the downstream or upstream signals, and the system is arranged as a "star-delivery" system.

Still another object of the system (disclosed in the "related applications" referenced above) in which the present invention may be used is, to house environmentally sensitive components in well-controlled environments such as a central office or a customer's premises.

Yet another object of the system (disclosed in the "related applications" referenced above) in which the present invention may be used to provide "star-delivery" system between the central location and each customers premises.

SUMMARY OF THE INVENTION

The above-mentioned shortcomings as well as other limitations and deficiencies are obviated, by a system (disclosed in the "related applications" referenced above) which utilizes a dedicated fiber optic cable interconnecting a customer's premises to a central location to propagate a downstream optical signal derived from a plurality of signals, either electrical or optical depending upon the embodiment, that are switched at the central location, the signal(s) selected being only that signal(s) subscribed to by the customer.

Briefly, the system (disclosed in the "related applications" referenced above) for communicating between each particular customer and the central location over the dedicated fiber may include: (a) an electrical switch, at the central location, for selecting only that signal (those signals) subscribed to by each subscriber, the electrical switch operating in response to control signals available at the central location; (b) an electrical-to-optical converter to generate an optical downstream signal from the selected electrical signal(s) for propagation over the single fiber; and (c) an optical-to-electrical converter for converting the downstream optical signal, delivered by the single fiber, to received versions of the original electrical signals.

Moreover, bi-directional communications may be effected by further arranging the system for transmitting second electrical signal(s) between the central location and the customer's premises, the electrical-to-optical converter being adapted for receiving the second electrical signal(s) at its input and for changing the downstream optical signal in correspondence to the second electrical signal(s), and the optical-to-electrical converter being adapted for converting the detected downstream optical signal into second electrical received versions of the second electrical signal(s) for use by the customer. For upstream communication to complete the bi-directional operational mode, the system may be arranged with an upstream electrical-to-optical converter, at the customer premises, for converting a third electrical signal(s) into an upstream optical signal, and for transmitting the upstream optical signal over the optical fiber at a second optical wavelength, and wherein the central location further includes an upstream optical-to-electrical converter for detecting the upstream optical signal and for converting the upstream optical signal to detected electrical versions of the third electrical signal(s). Typically the third electrical signal(s) is the counterpart to the second electrical signal(s) which, when paired, effect the bi-directional communication mode.

The system (disclosed in the "related applications" referenced above) in which the present invention may be used provides an improved fiber optic subscriber loop architecture which reduces the overall cost of the system and prevents theft of services. Such a system selectively transmits only information ordered by the subscriber to the subscriber premises and, thus, eliminates the need for scramblers (at the central office or network node) and descramblers (at the subscriber premises). This results in a reduction in equipment and cost of the overall system. Such an arrangement also prevents unauthorized use or access (i.e., theft) of information services by a subscriber premises.

In the systems (disclosed in the "related applications" referenced above), each of the selected signals may be mixed with a particular modulation signal of a particular frequency. These mixed selected signals may then be combined before being converted into an optical signal. It is an object of the present invention to generate local oscillator signals (e.g., signals generated by an oscillator) with which the selected signals may be mixed for upstream and downstream conversions. The present invention may generate such oscillator signals by dividing a pilot tone, such as an approximately 120 MHz pilot tone found on many cable TV systems. Oscillator signals for demodulating received selected signals may be similarly generated. Generating such oscillator signals in this way minimizes or eliminates unwanted "beat" frequencies, is relatively inexpensive to implement, minimizes phase noise and minimizes the complexity and number of components required for local oscillator circuitry.

DETAILED DESCRIPTION

1. Switching of Optical Signals

Figure 1:
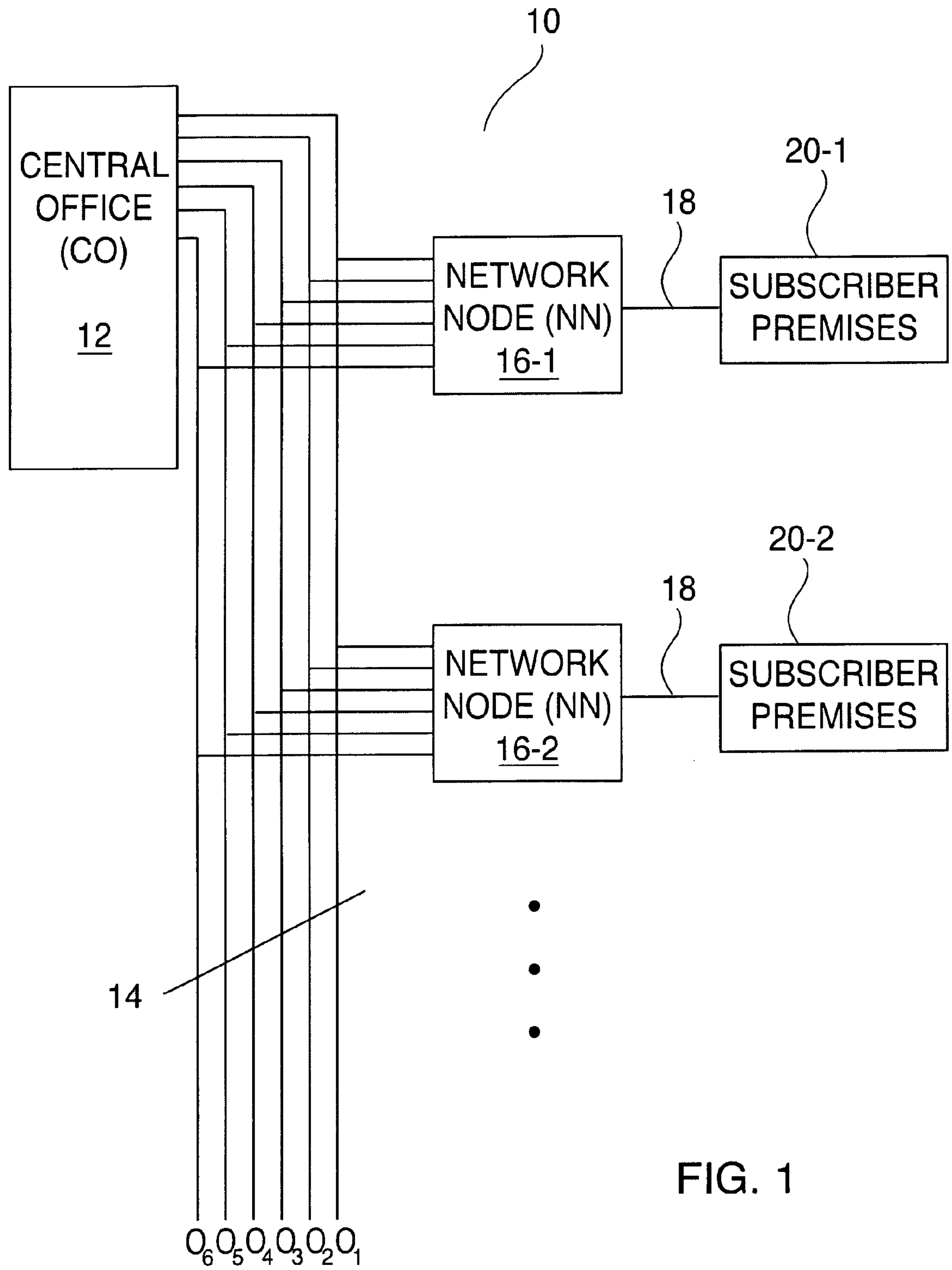
FIG. 1 is a block diagram of a fiber optic subscriber “loop” system with a central office that cooperates with a plurality of network nodes to provide selected information services to a plurality of subscriber premises.

FIG. 1 is a block diagram of an information distribution system 10. Information distribution system 10 includes a central office 12 which is connected by fiber optic feeder cable 14 to a plurality of network nodes (NN) 16-1, 16-2, . . . etc. Each network node 16-1, 16-2 is connected by a fiber optic line 18 to a corresponding subscriber premises 20-1, 20-2. As shown in FIG. 1, each network node 16-1, 16-2 is positioned exterior to a corresponding subscriber premises 20-1, 20-2.

At central office 12, a full band of downstream information, comprising six optical bands 01 through 06, is transmitted to each network node 16-1, 16-2 via fiber optic cables 14. Each network node 16-1, 16-2 selects a subset of bands 01 through 06 to which its respective subscriber premises 20-1, 20-2 is entitled (i.e., selects only those channels ordered by the subscriber). Such selected bands are then combined and transmitted to the corresponding subscriber premises 20-1, 20-2, across a single fiber optic line 18.

Figure 2:
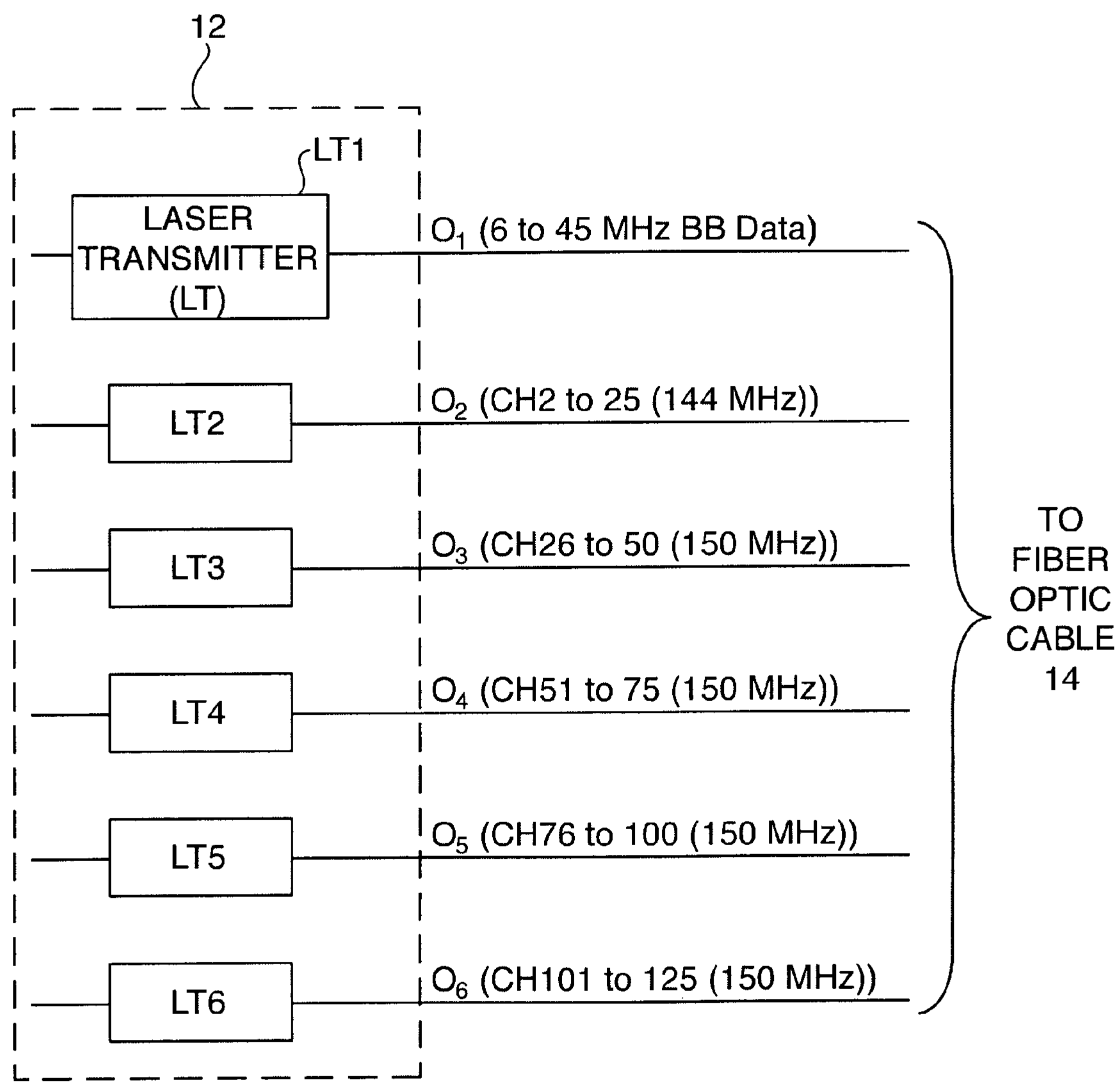
FIG. 2 is a block diagram of a central office in which the present invention may be used.

FIG. 2 shows a block diagram of central office 12 where electrical signals are converted to optical signals using laser transmitters, i.e., laser diodes, for light sources in the central-to-remote direction. Laser transmitters offer the linear performance characteristic required for the transmission of analog color signals and a higher frequency response than alternative LED light sources. Each laser transmitter generates a carrier wavelength corresponding to a different color. Signals are then modulated onto different carrier wavelengths for downstream transmission. Such modulation methods are commonly understood in the art and will not be discussed in further detail herein.

In one embodiment of information distribution system 10, central office 12 employs a full band from 5 MHz to 1000 MHz, which is divided into six optical bands 01 through 06, for transmitting downstream information to each network node 16 (FIG. 1). The electrical signals from each band are converted into optical signals, 01 through 06, by modulating six laser transmitters LT1 through LT6 at different wavelengths corresponding to different colors. After downstream information is modulated onto optical bands 01 through 06, the optical bands are then transmitted to each network node 16 (FIG. 1), via optic feeder cables 14.

The nature and purpose of each optical band, 01 through 06, is described herein (FIG. 2). Specifically, optical band 01 comprises the frequency domain of 5 MHz to 35-to-45 MHz and is preferably utilized for bi-directional data communication between central office 12 and premises 20. Optical bands 02 through 06 carry audio/video information for use by a television receiver, located at subscribers premises 20. Optical band 02, having a bandwidth of 144 MHz, carries information corresponding to channels 2 through 25; optical band 03, having a bandwidth of 150 MHz, carries downstream information corresponding to channels 26 to 50; optical band 04, having a bandwidth of 150 MHz, carries downstream information corresponding to channels 51 through 75; optical band 05, having a bandwidth of 150 MHz, carries downstream information corresponding to channels 76 to 100; and optical band 06, having bandwidth of 150 MHz, carries downstream information corresponding to channels 101 to 125. Although information distribution system 10 utilizes six optical bands for transmitting downstream information, any number of optical bands or any bandwidth may be utilized as desired. For instance, eight, sixteen and thirty-two optical bands are typically employed in the industry for downstream transmission.

Figure 3:
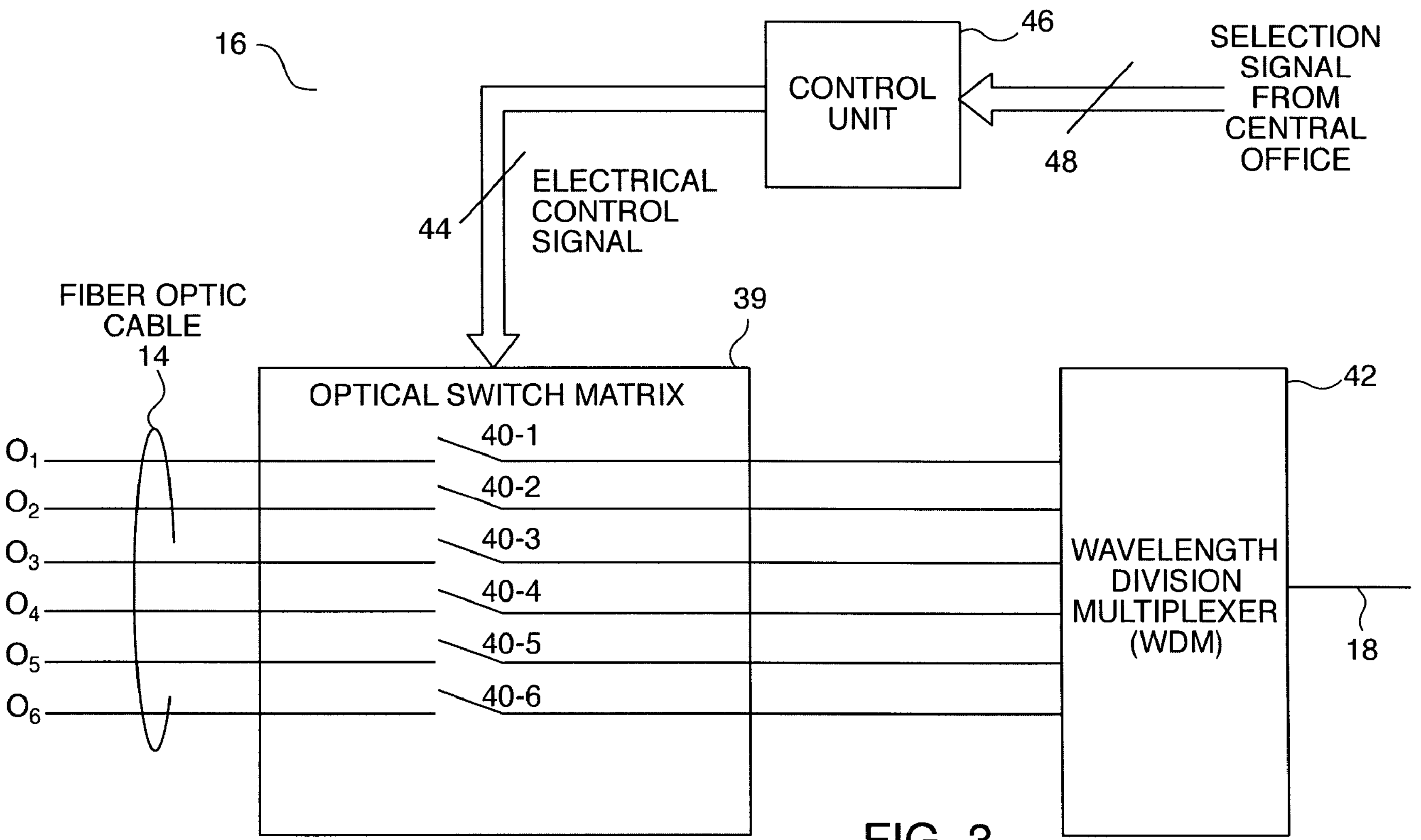
FIG. 3 is a block diagram of a network node which may be used in the system of FIG. 1.

FIG. 3 illustrates a network node 16 which includes an optical switch matrix 39 having optical switches 40-1 through 40-6 corresponding to optical bands 01 through 06. Optical bands 01 through 06 are received by network node 16, via optical cable feeder 14, and are respectively coupled to optical switches 40-1 through 40-6. Optical switches 40-1 through 40-6 can be controlled by electrical control signals to select or deselect any optical band 01 through 06 (via optical switches 40-1 through 40-6) destined for subscriber premises 20.

Optical switches 40-1 through 40-6 can be controlled from a remote location, i.e., central office 12, or preprogrammed to select or de-select any optical band 01 through 06 destined for subscriber premises 20. Such an arrangement can be accomplished in the following manner. Each network node 16 may include a microprocessor-based control unit 46 which is either pre-programmed with the subscriber's order or receives selection signals 48 (i.e., codes) from central office 12. Selection signals 48 may be received via telephone line, radio frequency (RF) or fiber optic cables 14. Upon receipt of selection signals 48, control unit 46, utilizing a digital-to-voltage (D/V) converter, generates electrical switch control signals 44 in accord with selection signals 48. Optical switch matrix 39 receives electrical control signals 44 and initiates the completion of the requested optical path connection, thus allowing only those optical bands ordered by subscriber premises 20 to be transmitted to subscriber premises 20.

Network node 16 further includes a wavelength division multiplexer (WDM) 42 which receives the selected optical bands (i.e., a subset of 01 through 06) from optical switch matrix 39. WDM 42 combines the selected optical bands into a single optical signal which is then transmitted across fiber optic line 18 to respective subscriber premises 20.

It is important to understand that network node 16 is positioned exterior to subscriber premises 20 (and not at subscriber premises 20) to prevent theft of services at subscriber premises 20. Network node 16 can be either mounted and installed at central office 12 or on a pole, vault or in a node configuration near subscriber premises 20. As can be appreciated by those skilled in the art, the switching function provided by network node 16 allows central office 12 to maintain control over downstream information (i.e., 01 through 06) by transmitting only those bands ordered by subscriber premises 20 to subscriber premises 20. Network node 16 eliminates the need for scramblers and descramblers at central office 12 and subscriber premises 20 and, thus, reduces the overall cost of the system. Such a system also prevents subscriber premises 20 from utilizing a black market set top box (i.e., an intelligent set top with descrambling capabilities) to steal information services.

Figure 4:
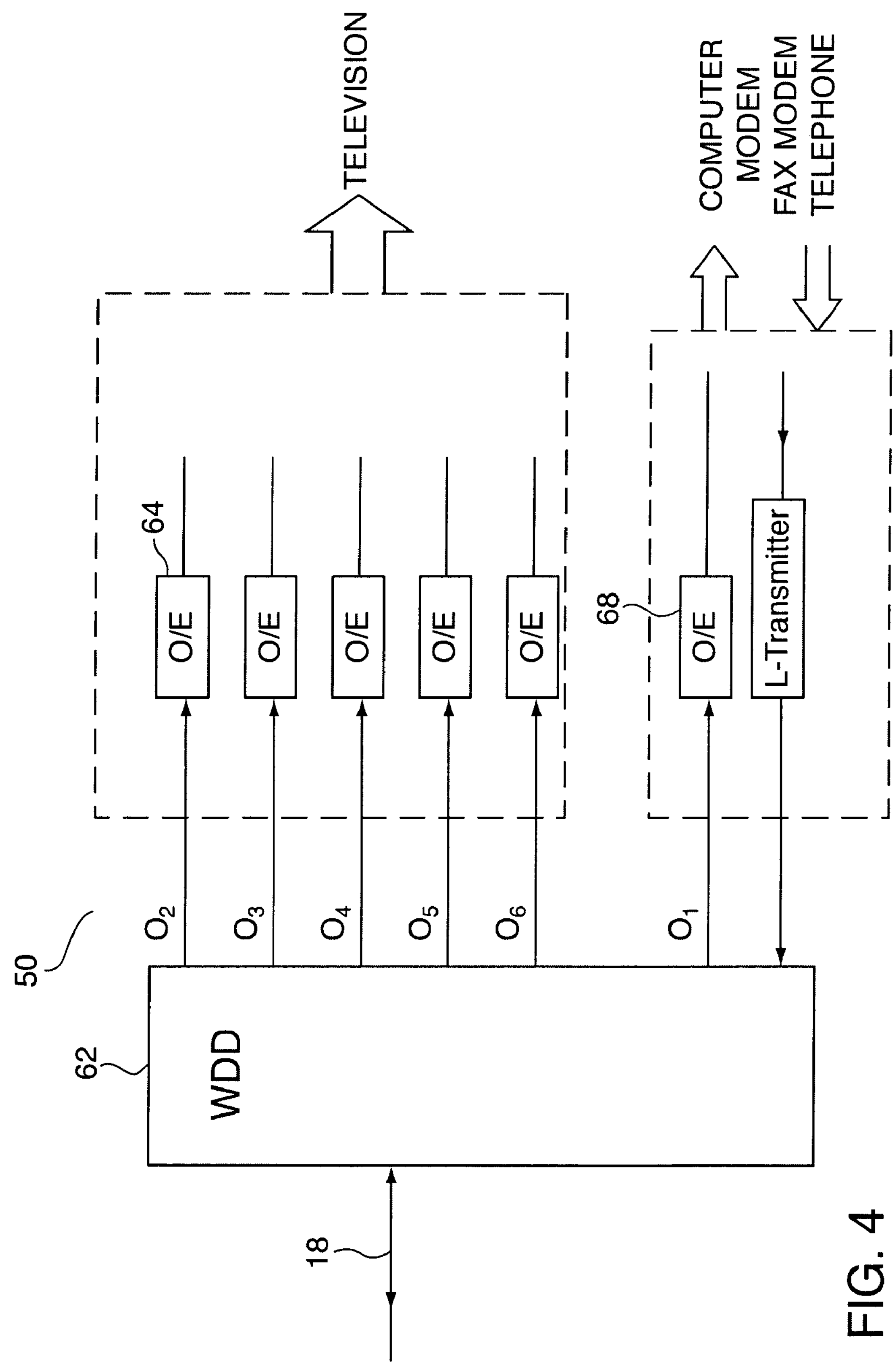
FIG. 4 is a block diagram of a subscriber premises in which the present invention may be used.

As illustrated in FIG. 4, subscriber premises 20 has a set top box 50 which receives the single optical signal (i.e., selected downstream information) from respective network node 16, via fiber optic line 18. Set top box 50 includes a Wavelength-Division Demultiplexer (WDD) 62 and a plurality of low bandwidth Optical/Electrical (O/E) converters.

WDD 62, coupled to fiber optic line 18, is utilized to separate optical bands 02 through 06. WDD 62 receives the single optical signal and separates it back into the selected optical bands, in particular, a subset of optical bands 02 through 06. Each selected optical band is then converted into an RF signal, by a corresponding low bandwidth O/E converter 64.

WDD 62 is also utilized to separate optical band 01 (i.e., 5 to 35-to-45 MHz BB data) from the single optical signal. As previously mentioned, optical band 01 is preferably utilized for both upstream and downstream data transmission between central office 12 and subscriber premises 20. Such an arrangement can be accomplished by having optical band 01 include both modulated and unmodulated wavelengths. The modulated wavelengths carry downstream information from central office 12 to subscriber premises 20; and the unmodulated wavelengths are utilized at subscriber 20 to transmit upstream information to central office 12. Subscriber premises 20 includes a laser transmitter 70 for modulating upstream information onto unmodulated wavelengths of optical band 01. Such a two-way data link can be utilized by a computer, fax machine, telephone, modem at subscriber 20.

It should be understood that, at subscriber premises 20, set top box 50 does not operate over the entire band, i.e., the single optical signal. That is to say, set top box 50 does not convert the entire single optical signal into RF. Instead, the components of the single optical signal are separated by WDD 62, and low bandwidth O/E converters 64, 68 are then employed to convert the selected bands into RF. Such an implementation reduces the overall cost of set top box 50 by eliminating the need to operate over the entire band at the same time. More importantly, such an arrangement allows information distribution system 10 to meet the required dynamic range and linearity specifications.

Instead of having a set top box for each television set at subscriber premises 20, set top box 50 can also be configured in the basement (or any other convenient location) of subscriber premises 20 to convert all delivered bands at once. The converted bands (i.e., channels) can then be transmitted to each television set in the clear, over cables. Such an arrangement eliminates the need for multiple set top boxes for those subscriber premises having more than one television set and, thus, may decrease the overall cost of the equipment at those subscriber premises.

2. Switching of Electrical Signals

The origin of the optical signals 01-06 in the description of the illustrative embodiment covered by FIGS. 1-4 was not presented in great detail except for the description with respect to FIG. 2, which indicated that electrical signals serve as inputs to a bank of lasers (LT1-LT6) and the electrical signals are converted to optical signals 01-06 using the laser bank.

Thus, whereas the foregoing description concentrated on the optical switching of optical signals 01-06 destined for each subscriber with a primary goal of preventing fraud, the illustrative embodiment of this section: (a) effects electrical switching of the original electrical signals which had impliedly been processed to produce optical signals 01-06; and (b) is configured so that sensitive components are located only in controlled environments, namely, the central office and/or the subscriber premises. Again, the goal of preventing fraud is realized.

However, the instant illustrative embodiment depicts a communication system arranged such that: (a) a dedicated fiber per subscriber is utilized, that is, each subscriber is connected to the central office with their own fiber optic cable so as to implement a "star" distribution network (in contrast to a "tree-and-branch" distribution); (b) a pair of low-power lasers is deployed per subscriber in a duplex communication mode—one laser is located in the central office for downstream transmission, and another laser is located at the subscriber premises for upstream propagation; and (c) both broadband and narrowband signals are propagated in the downstream direction at a first light wavelength or color, and only narrowband signals are propagated in the upstream direction at a second light wavelength or color. Accordingly, the downstream and upstream communications are separated by the wavelength of light, in contrast to the other heretofore known systems whereby bi-directional, narrowband communication is effected over only one of the light wavelengths.

2.1 Central Office Location 110

Figure 5:
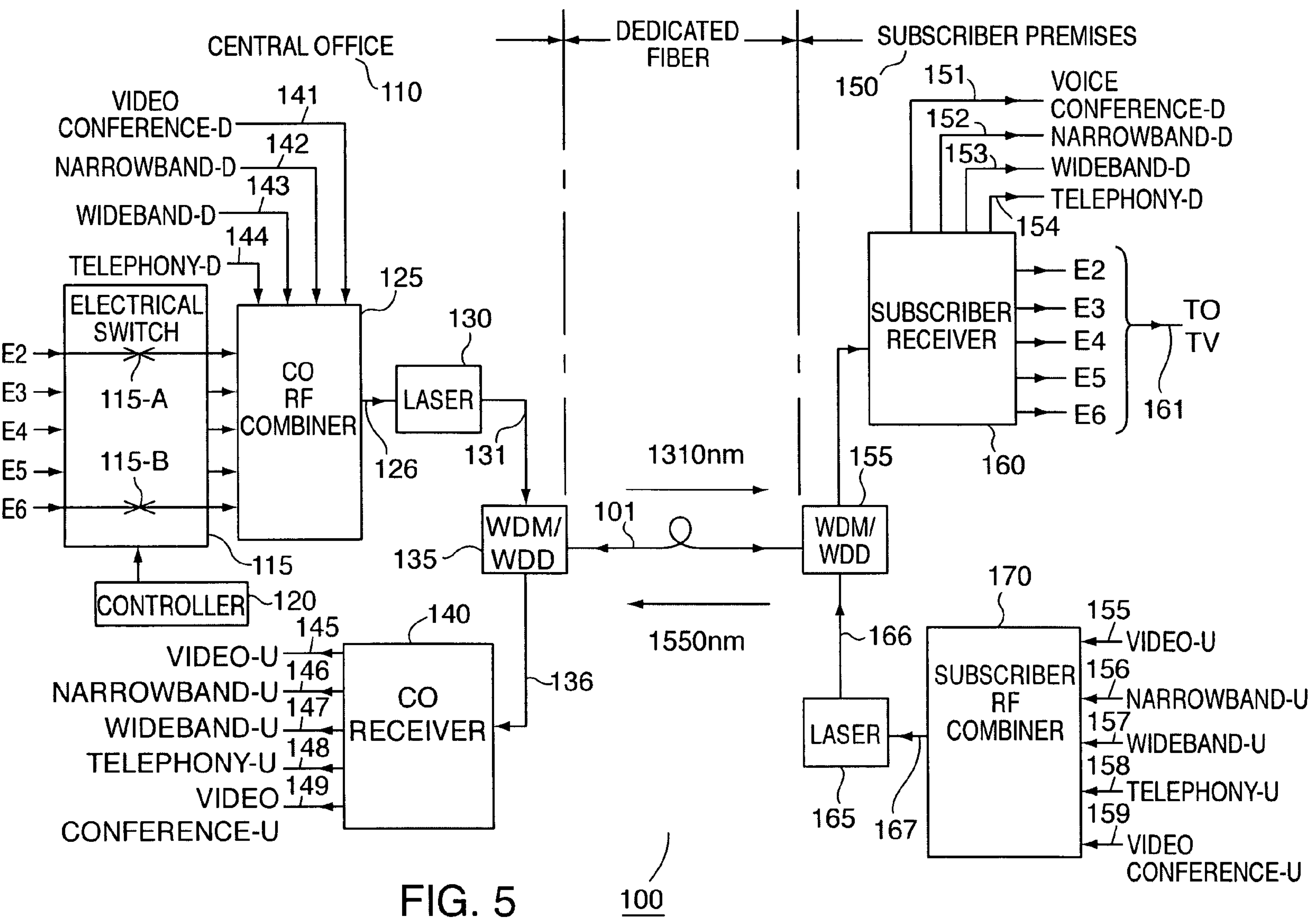
FIG. 5 is a high-level bock diagram of an illustrative system for an individual subscriber wherein electrical signals are switched and then processed to compose the optically transmitted signals.

With reference to FIG. 5, system 100 is shown in high-level block diagram form for a single subscriber. The elements of system 100 located in central office (CO) 110 include: (a) electrical switch 115 having electrical signals E2-E6 as inputs; (b) CO radio frequency (RF) combiner 125 having inputs from switch 115 as well as four other exemplary electrical signal inputs referred to as 'video-D', 'narrowband-D', 'wideband-D', and 'telephony-D' (the 'D' designating transmission downstream); (c) laser 130 coupled to combiner 125; (d) passive wave division multiplexer/wave division demultiplexer (WDM/WDD) 135 coupled to laser 130 as one input, and to dedicated fiber 101 as both an input and output; and (e) CO receiver 140 coupled to WDM/WDD 135. Receiver 140 has five exemplary outputs referred to as 'video-U', 'narrowband-U', 'wideband-U', 'telephony-U', and 'video conference-U' (the 'U' designating transmission upstream).

The electrical signals E2-E6 are, without loss of generality, those signals giving rise to optical signals O2-O6 discussed in the previous Section 1. From the preview section, the optical signals O1-O6 occupy a frequency band preferably from 5 MHz to 1000 MHz. For example, O2 conveys a 144 MHz frequency band corresponding to analog video channels 2 through 25; thereafter, each of the other bands O3-O6 occupies a 150 MHz band and conveys corresponding channels in blocks of 25. Finally, the optical signal O1 is used for the downstream component of bi-directional data and occupies the frequency band for 5 to 35-to-45 MHz. A summary of the frequency allocations for optical signals O1-O6 is shown in FIG. 6 for the downstream direction.

In general, each optical signal O1-O6 is derived from a corresponding set of electrical signals. For example, O2 is generated from an originating set of electrical signals referred to as E2, and the corresponding electrical signals composing E2 are twenty-four multiplexed signals for channel 2, channel 3, . . . , channel 25 where each channel occupies a 6 MHz band; similar originating electrical signals E3-E6 correspond to optical signals O3-O6. Electrical switch 115 is interposed for the purpose of delivering the combiner 125 only those channels subscribed to/desired by the particular downstream subscriber located at subscriber premises 150. For instance, if the customer at premises 150 only subscribes to the optical signals comprising O2 and O6, then switch 115 is closed to connect only E2 and E6 to combiner 125 (shown by closure points 115-A and 115-B of switch 115). Control of switch 115 is effected by controller 120, that is, as we discussed with respect to FIG. 3, selection signals are provided by CO 110 to controller 120 based upon the latest choice of service by the subscriber.

To reiterate, optical channel signal O1 typically is composed of the frequency band from 5 MHz up to 35-to-45. MHz, and is preferably used for the downstream component of bi-directional communications—such as video conferencing, wideband data (e.g., 10 Mbs), narrowband data (e.g., ISDN and ADSL), and multi-channel telephony. In system 100, the electrical signals used to generate O1 have now been shown separately as the electrical signals 'video conferencing-D', 'narrowband-D', 'wideband-D', and 'telephony-D', appearing on paths 141-144, respectively. Whereas E2-E6 are one-way signals intended for wide distribution to numerous subscribers, the downstream electrical signals on paths 141-144 generally, when paired with the upstream signals shown on paths 146-148 in FIG. 5, are bi-directional as well as subscriber-dependent, that is, these electrical signals are associated with a particular subscriber, so these signals are not switched by a switch as are signals E2-E6 by switch 115.

Figure 6:
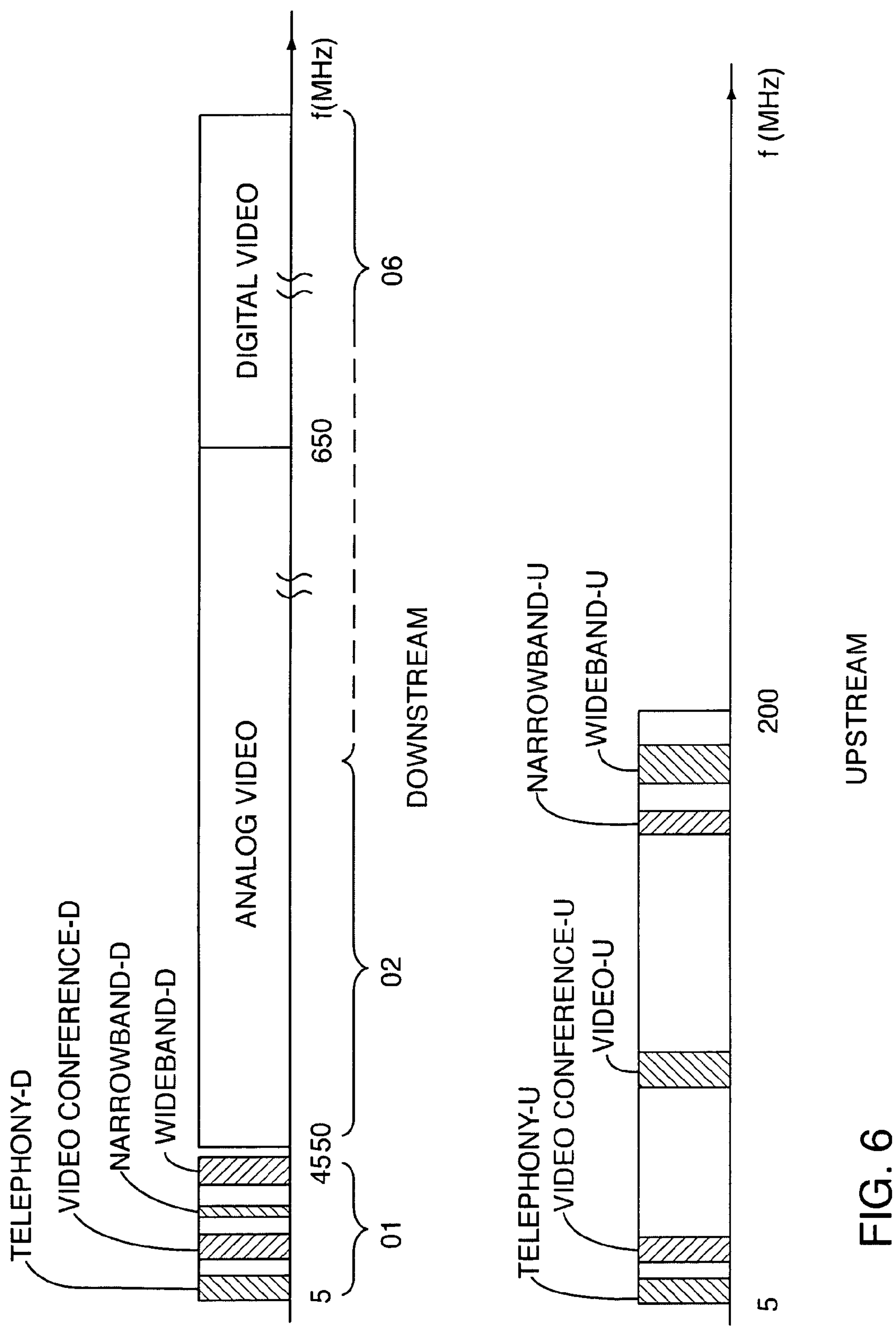
FIG. 6 depicts the frequency domain assignments for the downstream and upstream electrical signals.

RF combiner 125 functions as a frequency-division combiner which sums the modulated components of the various electrical signals into pre-defined frequency bands shown in FIG. 6. For instance, E3, composed of analog video channels 26 and 50 having a total bandwidth 150 MHz, is modulated to occupy a band of frequencies from 194 to 344 MHz. As another example, E6, composed of digital video channels occupying a total bandwidth of 150 MHz, is modulated to the high end of the overall bandwidth, that is, between 850 to 1000 MHz. On the other hand, for instance, 'telephony-D' may be composed of 6 telephone-like analog, vestigial sideband (VSB) modulated signals each having a 1 MHz bandwidth located, e.g., between 20-26 MHz, by the modulator functionally of combiner 125. Combiner 125 delivers a single modulated electrical output signal, composed of frequency-shifted baseband signals shown in the top-half of FIG. 6, on path 126 to laser 130. In turn, the single electrical signal on path 126 is used to modulate the optical output of laser 130, having an optical wavelength nominally 1310 nm for the preferred embodiment, to thereby generate a modulated optical output signal on path 131 emanating from laser 130. The modulated optical output signal on path 131 is delivered to WDM/WDD 135 for propagation over fiber 101 to subscriber premises 15D.

It can also be readily contemplated that it is possible to further subdivide the electrical composite signals E2-E6 into their constituent parts, so that if E2 is composed of electrical signals denoted E2(1), E2(2), . . . , E2(24) corresponding to 24 analog video channels, then each E2($i$), $i$=1, 2, . . . , 24, could serve as an input to switch 115. Each E2($i$) is a-baseband signal, and combiner 125 positions each E2($i$) to its assigned location in the RF bandwidth between 5 and 1000 MHz. Of course, switch 115 requires as many switching cross-points as there are individual electrical input signals in this realization; this is in contrast to the implementation shown in FIG. 5 wherein switch 115 requires only five cross-points.

2.2 Subscriber Premises 150

Again with reference to FIG. 5, the subscriber portion of system 100 located at subscriber premises 150, which could be implemented in a set-top box, includes: (a) passive WDM/WDD 155 which is coupled to dedicated optical fiber 101; (b) subscriber receiver 160 coupled to WDM/WDD 155; (c) subscriber RP combiner 170; and (d) transmitter laser 165 coupled to combiner 170 at its input and to WDM/WDD 155 as its output. Receiver 160 outputs the full video band containing E2-E6 originating at central office 110 on path 161 to a TV detector (not shown) of the subscriber's TV which detects the selected channels. Path 161 propagates E2-E6 as electrical signals located at juxtaposed frequency bands in the frequency domain as per the top-half of FIG. 6.

In addition, receiver 160 detects the signals used for bi-directional communication, namely, the counterparts to the signals appearing on paths 141-144 at CO 110; the counterparts are designated, as before, 'video-D', 'narrowband-D', 'wideband-D', and 'telephony-D' and appear on output paths 151-154, respectively. To recover the baseband version of these signals, receiver 150 includes a demodulator (discussed later) which converts the modulated signals (as produced by combiner 125 at CO 110) to baseband using standard demodulation techniques that are well-known in the art.

Five electrical signals for upstream communication, namely, 'video-U', 'narrowband-U', 'wideband-U', 'telephony-U', and 'video conferencing-U', appearing on paths 155-159, serve as inputs to subscriber RF combiner 170. The signals on paths 145-149 in CO 110 are the received counterparts of the signals originating on paths 155-159. The signals on paths 146-149 are the upstream components of the bi-directional communications effected by system 100, whereas the transmitted signal on path 155 and the received signal on corresponding path 145 conveyed only an upstream channel, such as 'Video-U' shown in FIG. 5. RF combiner 170 outputs a single electrical signal on path 167 to laser 165. The signal on path 166 serves as a modulation signal which modulates the intensity of laser 165 at the second, upstream light wavelength of, preferably, 1550 nm. The output of laser 165', on optical path 166, serves as an input to WDM/WDD 155, which signal is, in turn, propagated over fiber 101. The frequency allocations for the bi-directional communication aspect of system 100 are also shown in bottom-half of FIG. 6 for the upstream direction; the upstream signals preferably occupy a band from 5 to about 200 MHz.

2.3 Central Office Arrangement to Serve a Plurality of Subscribers

Figure 7:
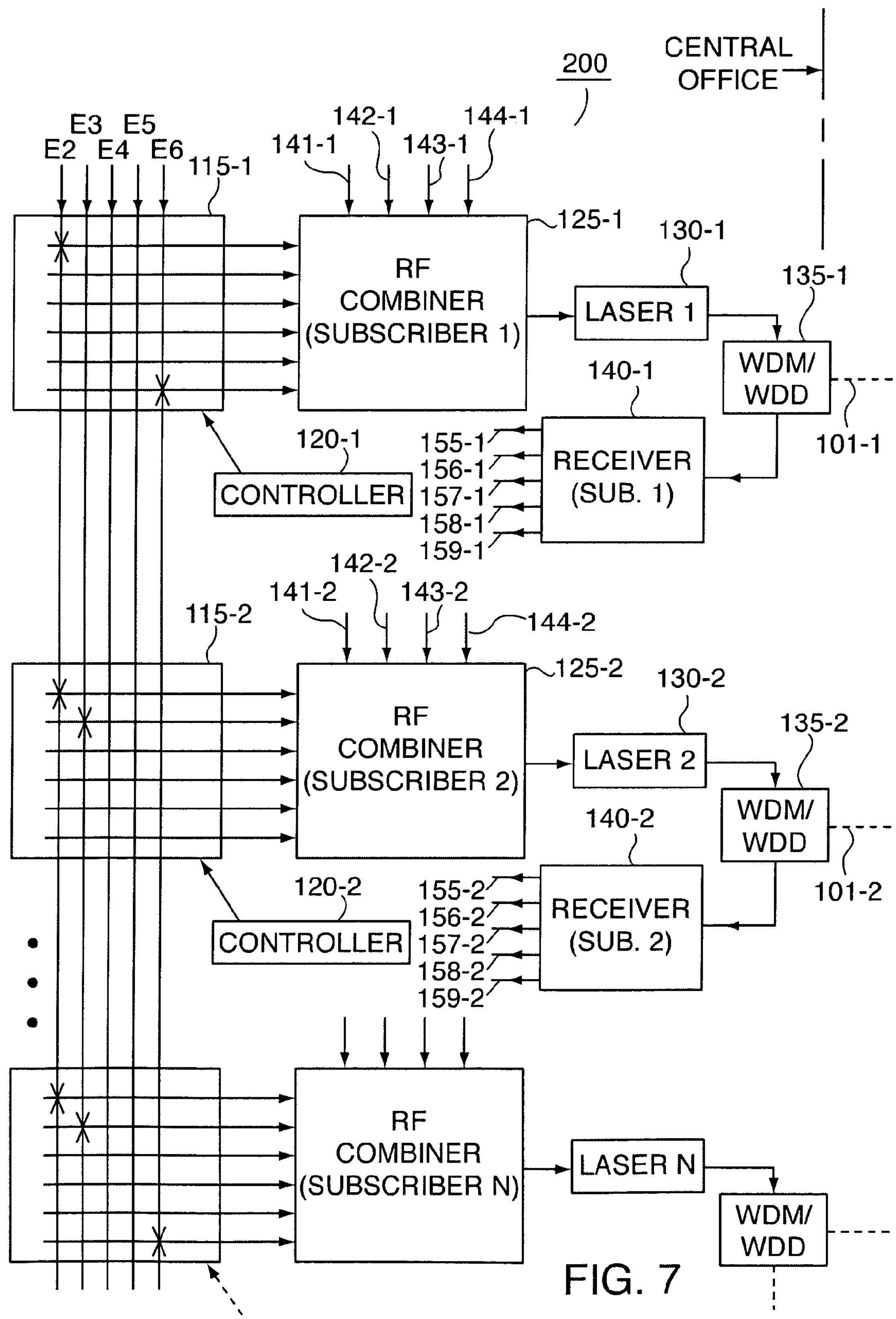
FIG. 7 is a high-level block diagram of an illustrative system for a plurality of subscribers each having the central office portion of the arrangement depicted in FIG. 5.

Turning now to FIG. 7, there is shown illustrative front-end arrangement 200 located in the central office for serving a plurality of customers each arranged according to the central office portion of system 100 of FIG. 5. For instance, subscriber 1 is served by switching matrix 115-1, RF combiner 125-1, laser 130-1, WDM/WDD 135-1, receiver 140-1, controller 120-1, and fiber 101-1, which are the counterparts, respectively, of matrix 115, combiner 125, laser 130, WDM/WDD 135, receiver 140, controller 120, and fiber 101 of FIG. 5. Similarly, subscriber 2 is served by switching matrix 115-2, RF combiner 125-2, laser 130-2, WDM/WDD 135-2, receiver 140-2, controller 120-2, and fiber 101-2. In the realization of FIG. 7, the electrical signals E2-E6 are provided as inputs to every switching matrix 115-1, 115-2, . . . , since E2-E6 must be accessible to every subscriber to satisfy service preferences.

Electrical signals on paths 141-1 through 144-1 are the counterparts to signals on paths 141 through 144 of FIG. 5, and similarly for the electrical signals on paths 141-2 through 144-2. The electrical signals on paths 141-1 through 144-1 are specific to subscriber 1, as the electrical signals on paths 141-2 through 144-2 are specific to subscriber 2, so the subscriber-specific signals need not be passed through a switch array.

For completeness, the upstream electrical signals on paths 155-1 through 159-1 for subscriber 1 are the electrical counter parts to the signals on paths 155-159 for FIG. 5, as are paths 155-2 through 159-2 for subscriber 2.

Finally, each subscriber of FIG. 7 (i.e., subscriber 1, subscriber 2, . . . , subscriber N) is served at their premises by that portion of system 100 shown on subscriber premises 150 of FIG. 5.

2.4 Illustrative Embodiments of Subscriber and CO Receivers and Combiners

2.4.1 First Embodiment

Figure 8:
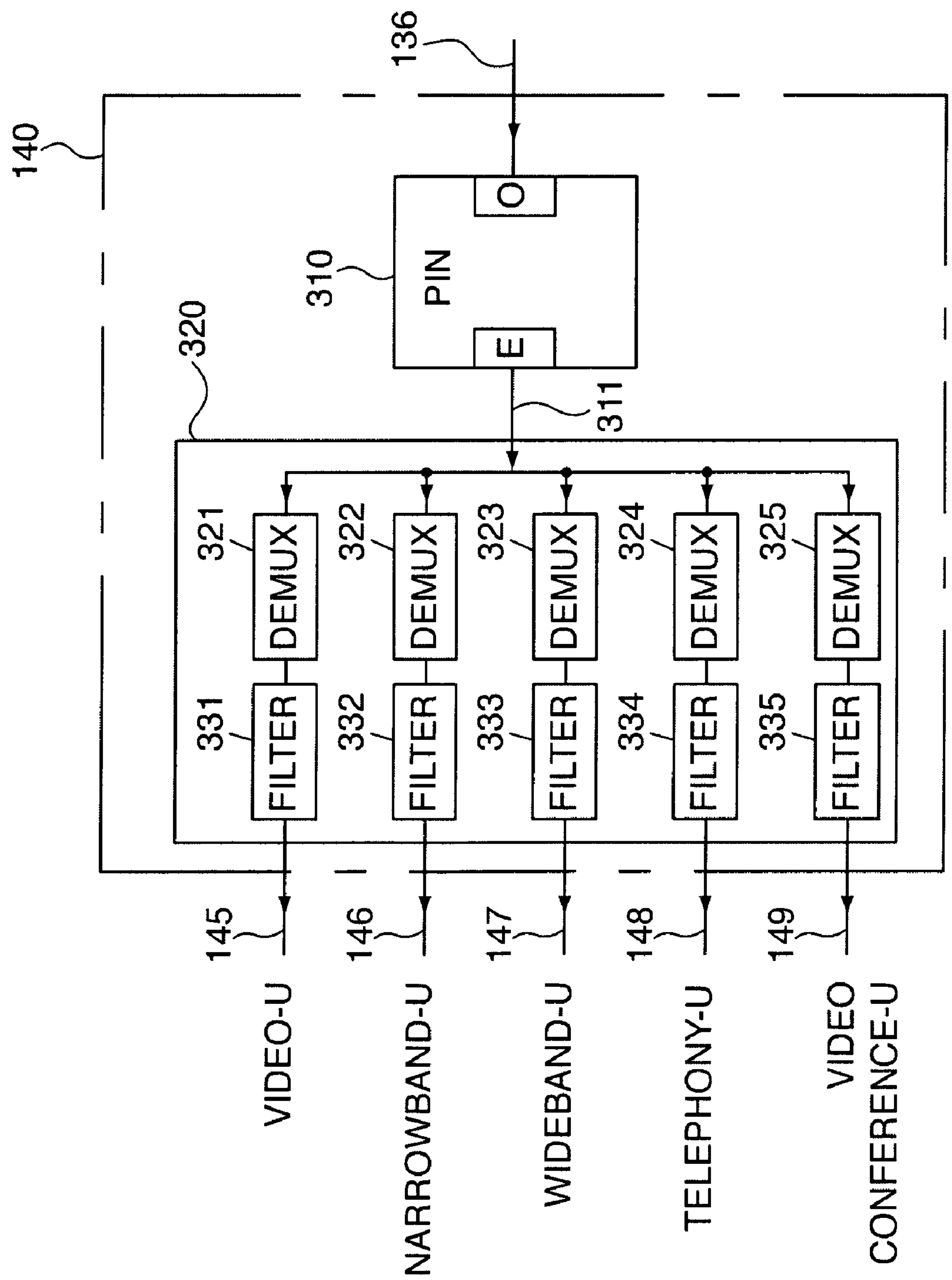
FIG. 8 is a block diagram of the central office receiver portion of the system show in FIG. 5.

Referring now to FIG. 8, there is shown a block diagram for central office receiver 140 of FIG. 5. In particular, receiver 140 includes: (a) PIN diode detector 310 coupled to WDM/WDD 135 via optical path 136 at port 0 and providing a multiplexed electrical output signal from port E to path 311, the multiplexed signal including the upstream communications signals 'video-U', 'video-conference-U' appearing on paths 155-159 of FIG. 5; and (b) electrical demultiplexer 320 for converting the multiplexed signal on path 311 to individual baseband signals corresponding to 'video-U', . . . , 'video conference-U', respectively. Demultiplexer 320 is, illustratively, composed of a bank of demultiplexers (demux) 321-325, and a bank of filters 331-335 such that: demux 321 and filter 331 form a cascaded pair; demux 322 and filter 332 form another cascaded pair; and so forth. The function of each demux-filter pair is to frequency shift each passband signal to baseband. Of particular interest is the operation of demux 324/filter 334 pair—since it is desirable to have a plurality of telephony paths, typically six independent paths, provided by system 100. If the signal on each telephony path is analog, then demux 324 is, itself, a bank of six demuxes wherein each demux in the bank demodulates the corresponding analog signal to baseband. To minimize the bandwidth of the analog signal, it may be preferable to transceive each telephony signal as an analog vestigial sideband (VSB) signal, so each demux converts a VSB signal to baseband. In this case, path 148 provides six parallel outputs, each corresponding to a baseband telephony signal. If the signal on each telephony path is digital, then it is necessary to interpose a D/A converter between path 311 and demux 324.

Subscriber receiver 160 is arranged in essentially the same manner as central office receiver 140 in that receiver 160 is composed of a PIN diode detector to convert the optical input signal from WDM/WDD 155 to an electrical signal, which signal in turn serves as the input to a bank of demux-filter pairs to thereby restore the downstream communication signals 'video conferencing D', 'telephony-D' to baseband.

2.4.2 Second Embodiment

Figure 9:
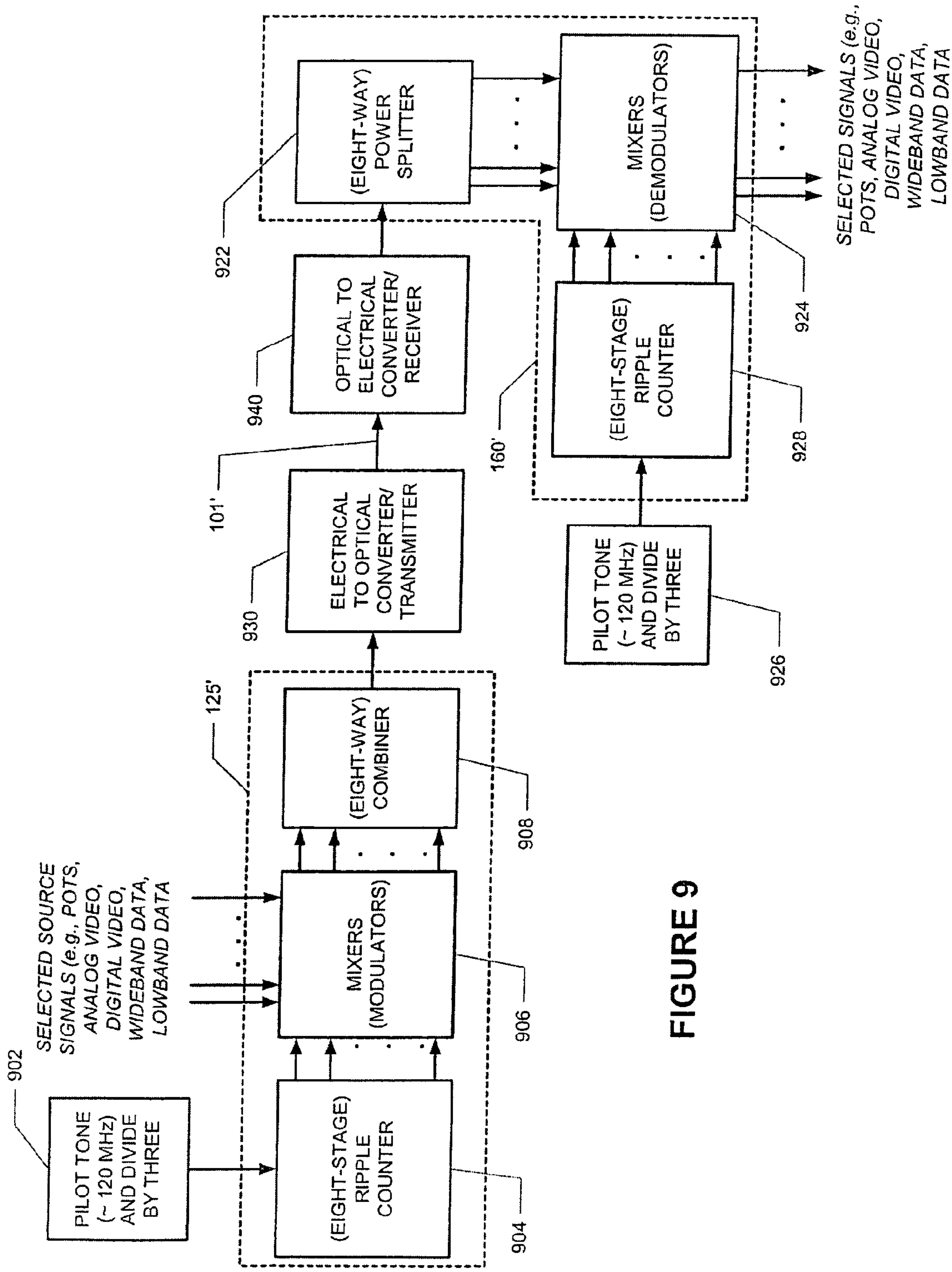
FIG. 9 is a block diagram of an embodiment for transmitting data from a central office to a subscriber which employs the local oscillator signal generation technique of the present invention.
Figure 10:
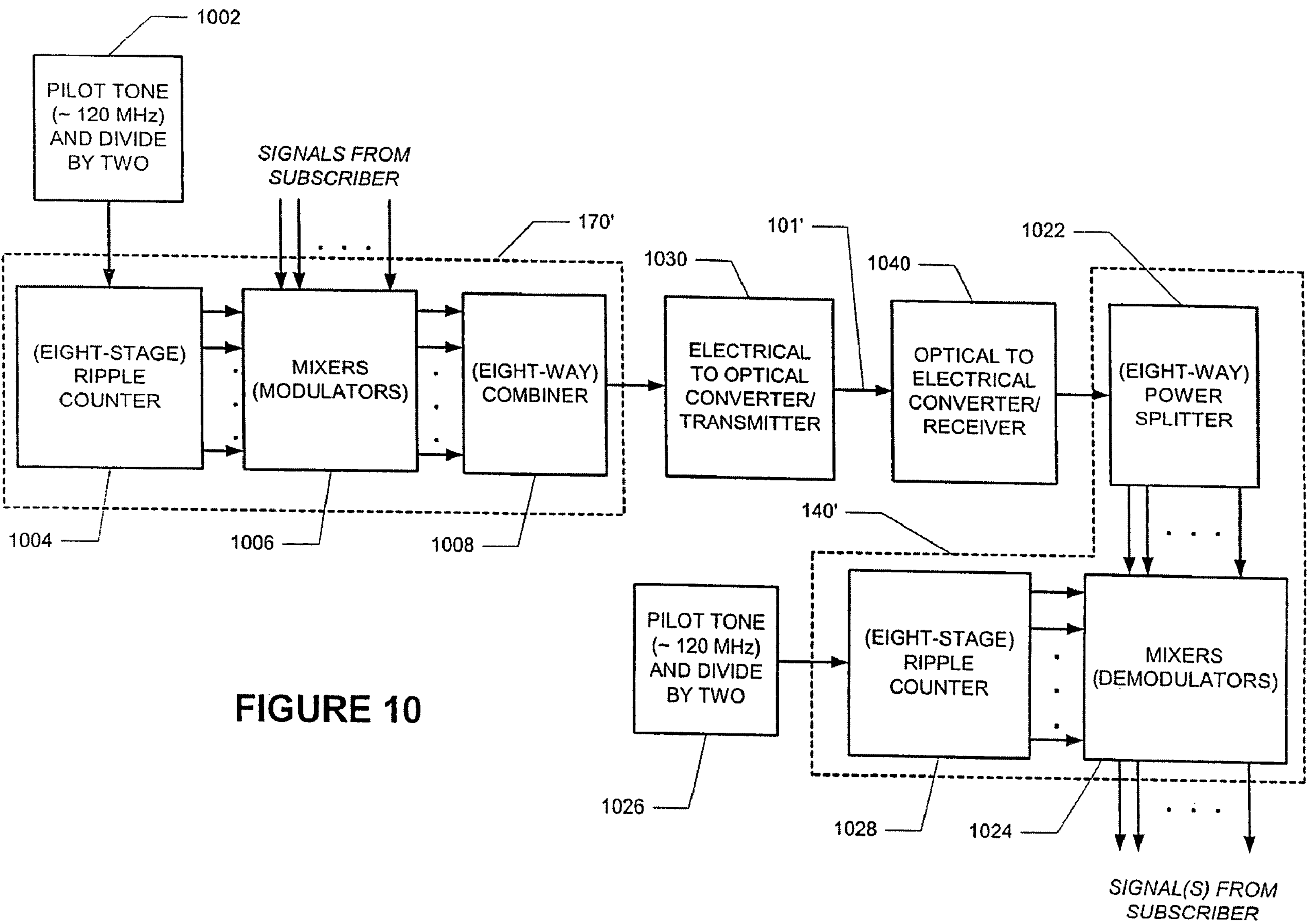
FIG. 10 is a block diagram of an embodiment for transmitting data from a subscriber to a central office which employs the local oscillator signal generation technique of the present invention.

Recall from FIG. 5 that data transmission may occur from the central office to a subscriber via a central office RF combiner 125 and a subscriber receiver 160. Similarly, data transmission may occur from the subscriber to the central office via a subscriber RF combiner 170 and central office receiver 140. FIGS. 9 and 10 illustrate exemplary embodiments which facilitate data transmission from the central office to the subscriber and from the subscriber to the central office, respectively.

In the following exemplary embodiment, it is assumed that the downstream optical wavelength is 1310 nm and the upstream optical wavelength is 1550 nm. In this way, the two streams can use the same fiber and yet be separated. The downstream (e.g., CATV) bandwidth may be provisioned as follows: the band from 54 MHz to 600 MHz for analog video and 600 MHz to 750 MHz for digital video. All of these channels may be combined in the RF domain utilizing cable TV channel combiners, which are commonly available in the CATV industry. The remaining two-way video conferencing, data communications, and telephony (POTS) may then be used to modulate carriers—each occupying an RF channel in the 0 to 50 MHz band for the downstream direction and 0 to 70 MHz for the upstream direction. The system of the present invention can transmit an upstream bandwidth greater than 70 MHz, but this is not necessary for this exemplary application. Single side band modulation may be used.

To generate a "carrier" wave (to be modulated by an information bearing signal, or to be used to demodulate a baseband signal to extract the information bearing signal), a local oscillator (LO) is provided for each "carrier". (Note that the term "carrier" is being loosely used here since an optical carrier wave is actually used to carry the information between the central office and the subscriber.) Unfortunately, however, high stability, low noise local oscillators are expensive and have a relatively large footprint (on a circuit board). One skilled in the art will appreciate that most amplitude modulated signals have the carrier frequency suppressed (and one of the two sidebands filtered out). If the carrier were not suppressed, energy would be wasted since the carrier frequency component carries no information. Unfortunately, however, suppressing the carrier makes subsequent extraction of the information bearing signal (e.g., demodulation) more difficult. In the current embodiment, a pilot tone operating at 119.775 MHz (approximately 120 MHz) may be generated at each central office and transmitted on the downstream optical bandwidth along with the CATV channels. Such a pilot tone is used in most cable TV systems for balancing and testing purposes. At the subscriber premises (e.g., customer home or other termination of the system), an interface circuit or box may be provided to separate out all of the video, data and POTS channels. At this point, the 120 MHz pilot tone will be filtered out, amplified, and provided to the upstream and downstream divider circuits.

As shown in FIG. 9 (which, recall, is used for data transmissions from the central office to the subscriber), an approximately 120 MHz pilot tone 902 may be provided to an exemplary central office RF combiner 125' after having been divided by three. Similarly, an approximately 120 MHz pilot tone 926 may be provided to an exemplary subscriber receiver 160' (after having been divided by three). As shown in FIG. 10

(which, recall, is used for data transmissions from the subscriber to the central office), an approximately 120 MHz pilot tone 1002 may be provided to an exemplary subscriber RF combiner 170' (after having been divided by two). Similarly, an approximately 120 MHz pilot tone 1026 may be provided to an exemplary central office receiver 140' (after having been divided by two).

The upstream (e.g., subscriber to central office) circuit may include a ripple counter, which includes a string of divide-by-two (e.g., multi-vibrator) circuits. This ripple counter may provide the following frequencies:

| | CHARACTERISTICS | | |
|---|---|---|---|
| SERVICE | CHANNEL BANDWIDTH (MHz) | APPROXIMATE CARRIER FREQUENCY (MHz) | ACTUAL CARRIER FREQUENCY (MHz) |
| WIDE BAND DATA | 10 | 60 | 59.8875 |
| WIDE BAND DATA OR DIGITAL VIDEO | 10 | 30 | 29.94375 |
| DIGITAL OR ANALOG VIDEO | 6 | 15 | 14.971875 |
| DATA | 2 | 7.5 | 7.485938 |
| DATA OR MUSIC | 1 | 3.75 | 3.742969 |
| DATA OR MUSIC | 0.5 | 1.875 | 1.871484 |
| LOW SPEED DATA OR POTS | 0.10 | 0.9375 | 0.935742 |
| LOW SPEED DATA OR POTS | 0.10 | 0.46875 | 0.467871 |
| POTS | 0.050 | 0.234375 | 0.233936 |
| POTS | 0.025 | 0.117188 | 0.116968 |

FIG. 10 illustrates such eight-stage ripple counters 1004/1028, one 1004 in the subscriber RF combiner 170' and the other 1028 in the central office receiver 140'. Each of the oscillator (e.g., carrier) signals from the eight-stage ripple counter 1004 may be mixed with a particular service data signal (if selected) at mixer 1006. The mixer 1006 actually includes a plurality of mixers, each of the mixers corresponding to a given data channel, and is therefore referred to as "mixers 1006" below. (Note that there may be less upstream services than downstream services, or at least not necessarily a one-to-one correspondence between the downstream and upstream services supported.) The oscillator signals as modulated by the data service signals (also referred to as "mixed signals") are then combined by combiner 1008, converted from an electrical signal to an optical signal by transmitter 1030 and provided on the communications medium 101'. At the central office, an optical to electrical receiver 1040 accepts the optical signal from the communications medium 101' and provides an electrical signal to (eight-way) power splitter 1022 which provides the selected signals to mixer (e.g., demodulator) 1024. The mixer 1024 actually includes a plurality of mixers, each of the mixers corresponding to a given data channel, and is therefore referred to as "mixers 1024" below. A 60 MHz signal (derived by dividing the 120 MHz pilot tone by two (2)) is provided to the (eight-stage) ripple counter 1028 which provides eight (8) oscillator signals to the mixers (e.g., demodulator) 1024. The mixers (e.g., demodulator) 1024 then produce (e.g., extracts) the original selected signal(s).

The downstream (e.g., central office to subscriber) circuit will first divide the 120 MHz pilot by three (3) to generate a 40 MHz tone. That 40 MHz tone will then be provided to a second ripple counter to generate the following frequencies:

| | CHARACTERISTICS | | |
|---|---|---|---|
| SERVICE | CHANNEL BANDWIDTH (MHz) | APPROXIMATE CARRIER FREQUENCY (MHz) | ACTUAL CARRIER FREQUENCY (MHz) |
| WIDE BAND DATA | 10 | 40 | 39.925 |
| WIDE BAND DATA OR DIGITAL VIDEO | 10 | 20 | 19.9625 |
| DIGITAL OR ANALOG VIDEO | 6 | 10 | 9.98125 |
| DATA | 2 | 5 | 4.990625 |
| DATA OR MUSIC | 1 | 2.5 | 2.495313 |
| DATA OR MUSIC | 0.5 | 1.25 | 1.247656 |
| LOW SPEED DATA OR POTS | 0.10 | 0.625 | 0.623828 |
| LOW SPEED DATA OR POTS | 0.10 | 0.3125 | 0.311914 |
| POTS | 0.050 | 0.15625 | 0.155957 |
| POTS | 0.025 | 0.078125 | 0.0779785 |

FIG. 9 illustrates such eight-stage ripple counters 904/928, one 904 in the central office RF combiner 125' and the other 928 in the subscriber receiver 160'. Each of the oscillator (e.g., carrier) signals from the (eight-stage) ripple counter 904 may be mixed with a particular service data signal (if selected) at mixer 906. The mixer 906 actually includes a plurality of mixers, each of the mixers corresponding to a given data channel, and is therefore referred to as "mixers 906" below. The oscillator signals as modulated by the data service signals ("mixed signals") are then combined by (an eight-way) combiner 908, converted from an electrical signal to an optical signal by transmitter 930 and provided on the communications medium 101'. At the subscriber, an optical to electrical receiver 940 accepts the optical signal from the communications medium 101' and provides an electrical signal to (e.g., eight-way) power splitter 922 which provides the selected ones of the signals to mixer (e.g., demodulator) 924. The mixer 924 actually includes a plurality of mixers, each of the mixers corresponding to a given data channel, and is therefore referred to as "mixers 924" below. A 40 MHz signal (derived by dividing the 120 MHz pilot tone by three (3)) is provided to the (eight-stage) ripple counter 928 which provides (eight (8)) oscillator signals to the mixers (e.g., demodulator) 924. The mixer (e.g., demodulator) then produces (extracts) the selected ones of the original signals.

Figure 11:
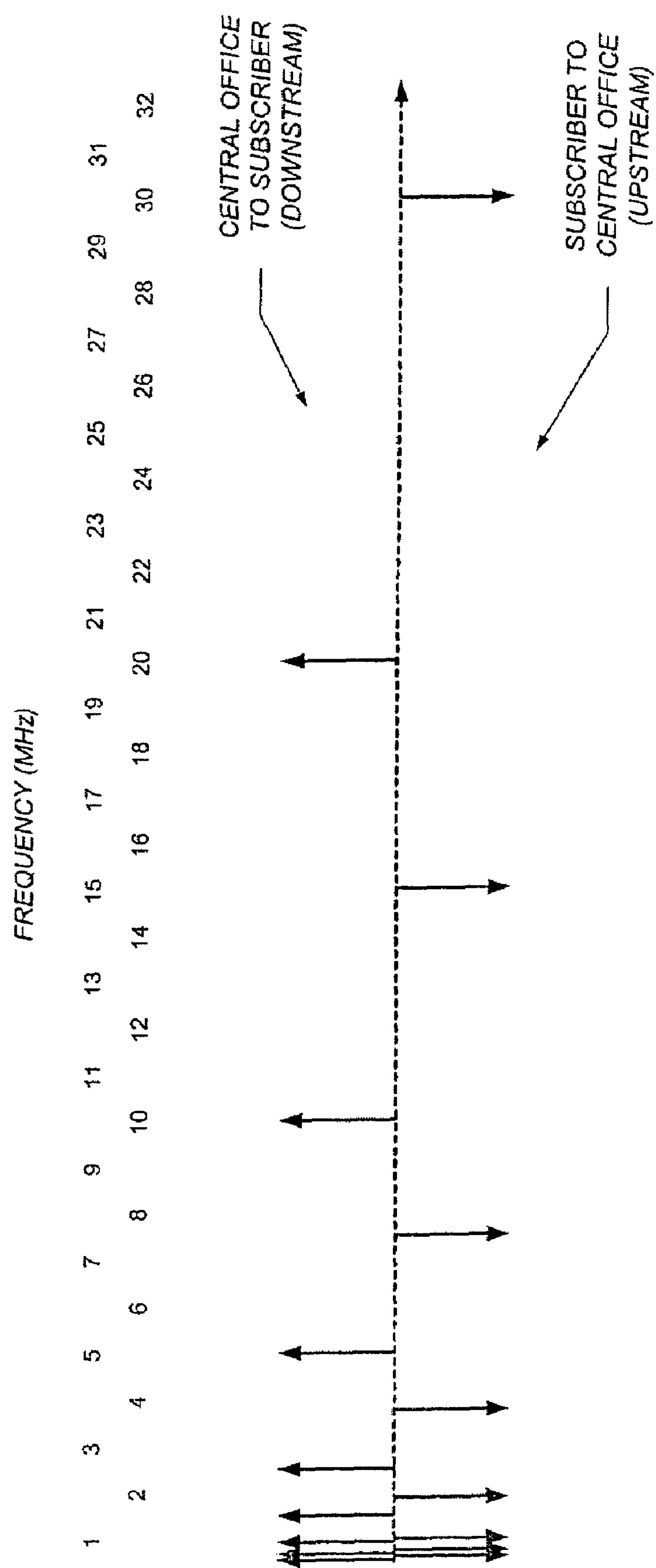
FIG. 11 illustrates frequencies of local oscillators used in upstream and downstream communications.

The upstream and downstream frequencies set forth in the Tables above, were selected to efficiently use the available bandwidth. FIG. 11 illustrates the upstream and downstream oscillator (e.g., carrier or modulation), frequencies. The downstream oscillator frequencies are indicated above the dashed line, while upstream oscillator frequencies are indicated below the dashed line. The upstream bandwidth can actually be as high as 300 MHz without adverse effects. Note also that the higher frequency local oscillators will typically be used for broader bandwidth services. This is because less and less bandwidth is available about oscillator frequencies as the frequencies of such oscillators are divided.

All of the local oscillator frequencies generated by these counter/divider circuits may be square waves which may be advantageous when the local oscillator is used as an input to an associated one of a plurality of doubly balanced mixers (This type of mixer suppresses the carrier frequency, generating only the upper and lower sideband signals.). More specifically, in each case, a square waveform may quickly saturate the diodes of such a doubly balanced mixer. The output of such a doubly balanced mixer is a double sideband signal (carrier frequency is suppressed). After proper filtering, this double sideband signal provides the single sideband signal used in this exemplary application and system.

Further, using the 120 MHz pilot tone provides a series of local oscillators that are coherent across the entire system. Such coherency minimizes or eliminates beat tone(s) (i.e., spurious signals) which would otherwise occur if the local oscillators were not coherent (i.e., unwanted additional sidebands would be generated otherwise). In this way, the carrier frequencies can be suppressed, thereby saving power, without the disadvantages normally associated with carrier suppression.

Furthermore, if the 120 MHz pilot tone is derived from a low noise source, then all of the local oscillators will be inherently low noise. Indeed, each time the pilot tone is divided by two, the phase noise may be reduced by 6 dB. For example, the 15 MHz local oscillator of the upstream system may have its phase noise reduced by 18 dB from that of the 120 MHz pilot tone (i.e., 120/2=60/2=30/2=15 for 6 dB+6 dB+6 dB=18 dB phase noise reduction).

In view of the foregoing, this embodiment generates local oscillator signals that are cleaner (e.g., less phase noise), cheaper to produce, and having a smaller footprint.

2.5 Components of the Preferred Embodiment of System 100

In a preferred embodiment of system 100, laser 130 is a distributed feedback (DFB) laser, such as the A371 series laser module manufactured by Lucent Technologies; laser 130 operates at a low-powered (e.g., about 2 mW) and exhibits a linearity characteristic suitable for propagating optical signals over the band with from 5-1000 MHz. Laser 165 may be of the same type as laser 130, although the requirements on laser 165 are not as rigorous as those of laser 130 because laser 165 operates over a narrower bandwidth. WDD/WDM 135 and 155 are available as standard optical components. Each crosspoint of switch 115 may be realized by a micro-mechanical electrical switch (MEMS) such as available from the Rockwell Corporation. RF combiners 125 and 170 are conventional components available from Jerrold Electronics.

3.0 Relation Between Optical and Electrical Switching Aspects of the Embodiments As stated in Section 1.0, optical band O1 is preferably utilized for bi-directional data communication between the central office and the subscriber premises. With reference to this operational mode, it was further stated in Section 1.0 that the subscriber premises includes a laser transmitter for modulating upstream information onto unmodulated wavelengths of optical band O1, and that the two-way data link can be utilized by a computer, fax machine, telephone, or modem.

Section 2.0 sets forth in detail, particularly with respect to FIG. 5, how bi-directional communication can readily be effected using one optical wavelength for downstream propagation of 'telephony-D', 'narrowband-D', and other optical wavelength for upstream propagation of 'telephony-U', 'narrowband-U', . . . , which are the counter parts to the former signals. It is readily apparent to one of the ordinary skill in the art that the more detailed description with respect to FIG. 5 is equally applicable to the description of FIG. 4 wherein the bi-directional aspect of the optical switching aspect of the present invention was also described for the optical switching embodiment.

The invention having thus described with particular reference to the preferred forms thereof, it will be obvious that various changes and modifications may be made therein without departing from the spirit and scope of the invention as defined in the appended claims.

What is claimed:

1. A method, comprising:

selecting downstream optical signals by:

receiving a selection signal corresponding to a level of service of a subscriber at a central office, and generating a modulated electrical output in accordance with the selection signal at the central office;

converting the modulated electrical output into the selected downstream optical signals at the central office by modulating an optical output of a first laser;

receiving, at a subscriber premises, the selected downstream optical signals out of a plurality of downstream optical signals from an information distribution system, the selected downstream optical signals corresponding to the level of service of the subscriber to the information distribution system;

converting the selected downstream optical signals to electrical signals;

passing each of the electrical signals through a downstream cascaded demultiplexer-filter pair;

transmitting the electrical signals as radio frequency signals to one or more connected devices at the subscriber premises;

receiving an upstream electrical signal from one of the one or more connected device at the subscriber premises;

converting the upstream electrical signal into an upstream optical signal by modulating an optical output of a second laser; and transmitting the upstream optical signal to the information distribution system.

2. The method of claim 1, wherein the selected downstream optical signals include video, and the upstream optical signal includes data transmissions.

3. The method of claim 1, wherein at least one of the one or more connected devices is a television.

4. The method of claim 1, wherein the radio frequency signals are transmitted over a cable and within the frequency range of 5 MHZ to 1000 MHz.

5. The method of claim 1, wherein the one or more connected devices includes at least one of a computer, a telephone and a fax machine.

6. The method of claim 1, wherein the selected downstream optical signals are a smaller subset of the plurality of downstream optical signals.

* * * * *